(12) United States Patent
Hermann et al.

(10) Patent No.: US 8,348,007 B2
(45) Date of Patent: Jan. 8, 2013

(54) DEVICE FOR ELASTICALLY MOUNTING AN ENGINE TRANSMISSION UNIT ON A MOTOR VEHICLE BODY

(75) Inventors: Waldemar Hermann, Jossgrund (DE); Heiko Pichel, Steinau (DE)

(73) Assignee: Anvis Deutschland GmbH, Steinau an der Strasse (DE)

( * ) Notice: Subject to any disclaimer, the term of this patent is extended or adjusted under 35 U.S.C. 154(b) by 366 days.

(21) Appl. No.: 12/531,791

(22) PCT Filed: Jan. 15, 2009

(86) PCT No.: PCT/EP2009/000225
§ 371 (c)(1),
(2), (4) Date: Dec. 29, 2009

(87) PCT Pub. No.: WO2009/090071
PCT Pub. Date: Jul. 23, 2009

(65) Prior Publication Data
US 2012/0267186 A1    Oct. 25, 2012

(30) Foreign Application Priority Data
Jan. 17, 2008 (DE) .................. 20 2008 000 685 U

(51) Int. Cl.
*B60K 17/00* (2006.01)
*F16F 15/04* (2006.01)

(52) U.S. Cl. ............... 180/382; 180/312; 267/140.13; 248/560

(58) Field of Classification Search ............ 180/382, 180/312, 293, 291; 267/141.1, 140.13, 141.2, 267/144.3, 140.12, 136, 141, 141.3, 141.4, 267/141.7, 292, 293; 248/560, 562, 575, 248/576
See application file for complete search history.

(56) References Cited

U.S. PATENT DOCUMENTS
5,556,071 A * 9/1996 Bellamy et al. .......... 267/140.13
(Continued)

FOREIGN PATENT DOCUMENTS
DE      11 38 417      10/1962
(Continued)

OTHER PUBLICATIONS

Anvis Deutschland GMBH, International Patent Application No. PCT/EP2009/000225, International Search Report and Written Opinion, dated Jul. 6, 2009.

(Continued)

*Primary Examiner* — Drew Brown
(74) *Attorney, Agent, or Firm* — Steven B. Phillips; Moore & Van Allen PLLC

(57) ABSTRACT

A device for elastically mounting an engine transmission unit on a motor vehicle body, comprising a motor support, a flange rigidly mountable to the motor vehicle body, defining a longitudinal direction to be aligned with the driving direction, wherein the motor support essentially extends out of the flange in a transverse direction, perpendicular to the longitudinal direction, and is facing the engine transmission unit for forming a mounting area for the engine transmission unit, and an elastomeric body via which the motor support is elastically supported by the flange and which has a vertical support spring to absorb an essentially static load from the weight of the engine transmission unit, the load acting vertically to the longitudinal direction and the transverse direction, wherein the vertical support spring comprises two spring arms inclined towards each other and spreading away from each other in transverse direction.

20 Claims, 2 Drawing Sheets

U.S. PATENT DOCUMENTS

Figure 5:
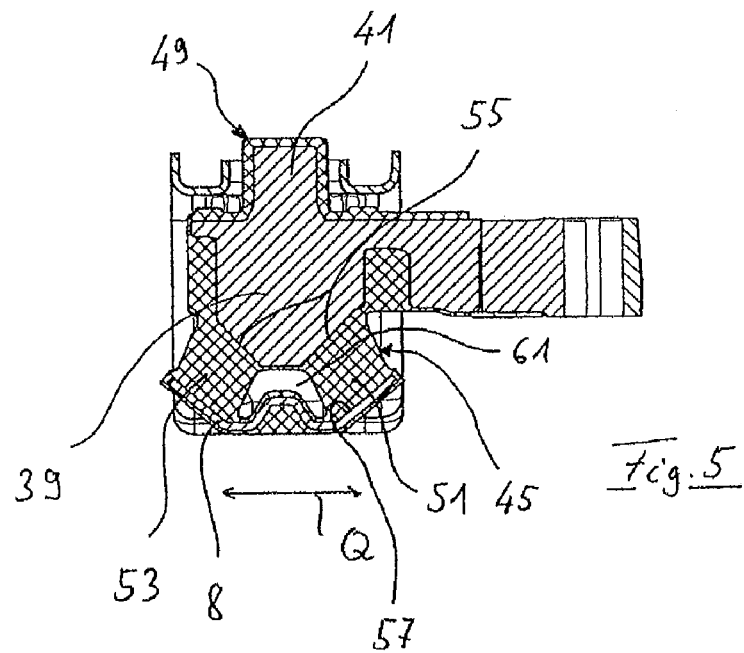

| | | | |
|---|---|---|---|
| 6,019,342 A * | 2/2000 | Pelle | 248/562 |
| 7,111,705 B2 * | 9/2006 | Ohta et al. | 180/312 |
| 7,278,633 B2 * | 10/2007 | Yamamoto et al. | 267/140.13 |
| 8,104,749 B2 * | 1/2012 | Okumura et al. | 267/140.13 |
| 2006/0043656 A1 * | 3/2006 | Shimizu | 267/140.11 |
| 2011/0056761 A1 * | 3/2011 | Weissbecker et al. | 180/382 |
| 2012/0205846 A1 * | 8/2012 | Schaefer | 267/140.13 |

FOREIGN PATENT DOCUMENTS

| | | |
|---|---|---|
| DE | 22 30 528 | 7/1973 |
| DE | 36 21 317 | 1/1987 |
| DE | 10 2005 020 430 | 8/2007 |
| DE | 10 2005 033 509 | 3/2008 |
| EP | 1 321 692 | 6/2003 |
| FR | 2 809 996 | 12/2001 |
| GB | 2 417 542 | 3/2006 |
| JP | 07-2 23 444 | 8/1995 |
| JP | 11-0 51 117 | 2/1999 |
| JP | 2007-2 98-081 | 11/2007 |

OTHER PUBLICATIONS

Anvis Deutschland GMBH, German Patent Application No. DE 20 2008 000 685.6; German Search Report, dated Sep. 25, 2008.

* cited by examiner

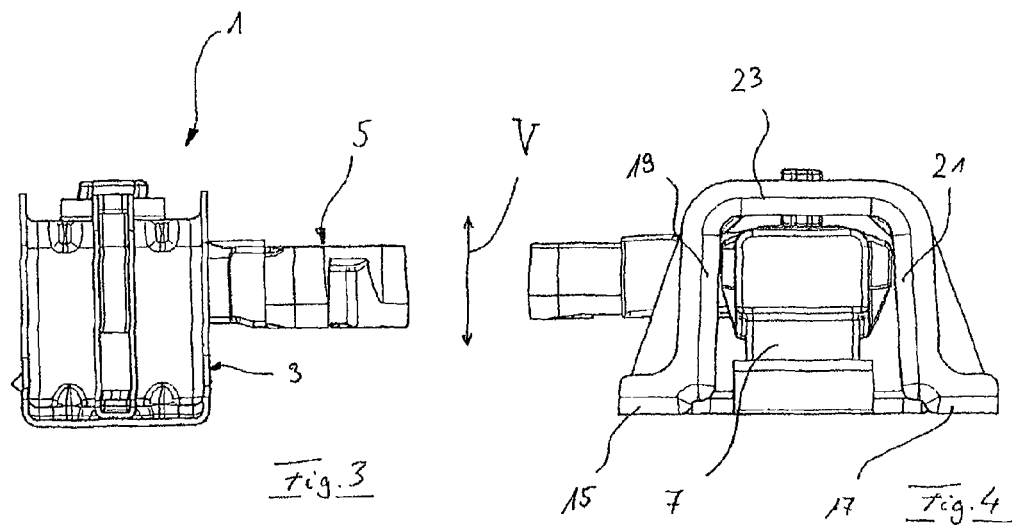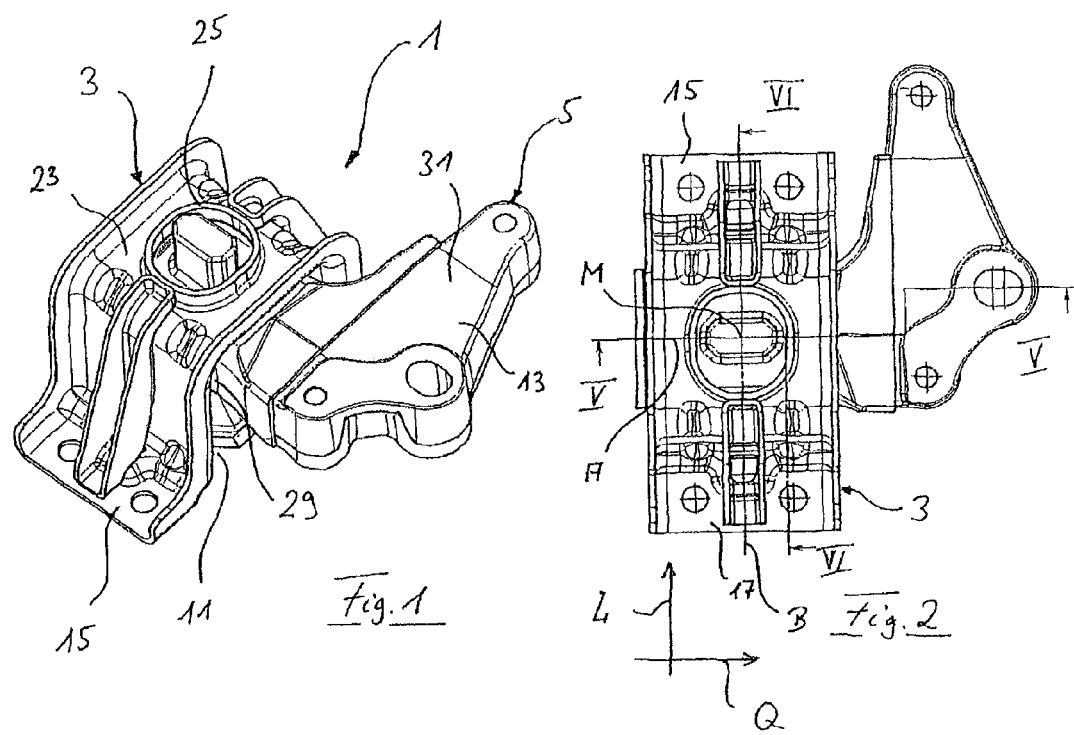

DEVICE FOR ELASTICALLY MOUNTING AN ENGINE TRANSMISSION UNIT ON A MOTOR VEHICLE BODY

The invention relates to a device for elastically mounting an engine transmission unit on a motor vehicle body.

It is known to connect the engine transmission unit to the motor vehicle body via elastic mountings. The elastic mountings have a motor support rigidly mountable onto the engine transmission unit and a flange rigidly mountable to the motor vehicle body. Typically, the flange is formed like a bridge partially surrounding the motor support in longitudinal direction. The bridge shaped flange extends in a longitudinal direction, which, during assembly, is to be aligned with the driving direction of the vehicle. The motor support has a mounting area at which the engine transmission unit is to be tightly fixed and which projects in a transverse direction out of the bridge shaped flange and faces the engine transmission unit for easy access.

The elastomeric body of a known elastic mounting serves for elastically supporting the motor support by the flange. The elastomeric body is known to have a vertical support spring which essentially receives a static load vertical to the longitudinal and the transverse direction of the vehicle. Commonly, the vertical support spring is formed as a sleeve in order to also provide support in a transverse and longitudinal direction evenly.

Furthermore, the known elastic mounting has elastomeric bearing surfaces at a vertical external surface at a support section of the motor support surrounded by the flange in order to limit the maximum displacement of the motor support in longitudinal direction. The elastomeric bearing surfaces cooperate with an internal surface of the bridge shaped flange. Besides, the known elastic mounting has an elastic abutment located outside the bridge shaped flange which extends longitudinally and is fixed to the motor support and limits a maximum movement of the flange in transverse direction.

The known elastic mounting is used in particular for elastically fixing an engine transmission unit to a motor vehicle body mounted transversely to the driving direction. It became apparent for transversely mounted engine transmission units that a comparatively large space is occupied within the engine compartment owing to the large dimensions of the elastic mounting, especially in longitudinal direction. However, in order to improve the crash behaviour of a motor vehicle with transversely mounted engine transmission units, it is necessary to provide large crumple zones in the engine compartment.

It is an object of the invention to overcome the disadvantages of the prior art, especially to provide a device for elastically mounting a motor transmission unit to a motor vehicle body with which an optimisation of the crash behaviour is possible for a motor vehicle with transversely mounted engine transmission unit.

This object is realised by the features of claim 1. Accordingly, the vertical support spring of the elastomeric body is formed by two spring arms inclined towards each other, defining two spring directions which form an acute angle in the vertical and the transverse direction for receiving a load from the weight of the engine transmission unit being essentially static and vertical to the longitudinal and transverse direction of the vehicle. Thereby, the spring arms spread away from each other in transverse direction. With the feature of a spring arm pair that is inclined towards each other and positioned in a V-shape according to the invention, a distinct reduction of the dimensions of the mounting can be achieved in its longitudinal direction without impairing the spring damping behaviour or the acoustic decoupling of the elastic mounting device. By forming two spring arms inclined towards each other with spring directions forming an acute angle towards the vertical and the transverse direction, a relatively good elastic and stable mounting is realised in transverse direction, receiving its main loading during curve driving, while a sufficient resilience of the mounting is realised in longitudinal direction in which the spring arms are not inclined.

In a preferred embodiment of the invention, the elastomeric body forms a transverse spring abutment for limiting an amplitude of movement of the motor support in transverse direction and a longitudinal spring abutment for limiting an amplitude of movement of the motor support in longitudinal direction. Preferably, all the functional components such as the spring arms, the transverse spring abutment as well as the longitudinal spring abutment are formed at the motor support, especially in one production step and in one piece and attached by vulcanisation.

Preferably, the spring arms are symmetrical to an axis extending in vertical direction, wherein the spring directions are essentially vertical to the longitudinal direction, and the angle of each spring direction towards the vertical direction/transverse direction are essentially equal.

In a further development of the invention, the spring direction of a spring arm is essentially defined by a direction vertical to contact surfaces for the spring arms on the motor support and on the flange, the contact surfaces being parallel and facing each other diametrically. The contact surfaces for the spring arms are inclined with respect to the vertical and transverse direction and each lie in a plane in longitudinal direction.

In a preferred embodiment of the invention, an imaginary intersection of the spring direction is located inside the motor support especially in a solid body of the motor support. Preferably, an imaginary intersection of the spring directions is located on a longitudinal axis of symmetry of the flange.

In a further development of the invention, the flange has an arch shape or bridge shape extending in longitudinal direction with at least one open passage in transverse direction. The motor support extends through the passage in order to provide the mounting area for the engine transmission unit freely accessible from all sides. The arch shaped flange is closed at its open bottom side by a separate plate.

In a further development of the invention, the motor support has an attachment section surrounded by the flange where the elastomeric body is mounted. The attachment section can have the shape a comb with at least two, preferably three teeth extending in vertical direction. Therein the teeth can extend essentially straight in vertical and in transverse direction. The teeth are rigidly connected with each other via a long basis of the attachment section. The teeth are arranged in a longitudinal direction at preferably equal distances.

In a preferred embodiment of the invention, the flange is formed out of one piece of sheet metal the wall thickness of which is less than 5 mm, preferably about 3 mm. Preferably, the piece of sheet metal has ribs in longitudinal direction on its outside in order to reinforce the flange.

In a further development of the invention, the motor support has an abutment peg protruding in vertical direction and extending through an encirculating hole formed in the flange, so that a movement amplitude of the motor support relative to the flange is limited at least in transverse direction.

Therein, the distance in transverse direction between the abutment peg and the hole can be minimal.

Preferably, a middle axis of the oval or circular hole lies on a longitudinal axis of the flange, wherein the abutment peg has a larger dimension in transverse direction than in longitudinal direction. Preferably, the abutment peg is padded with elastomeric material.

In a further development of the invention, one elastomeric rib is attached at each one of opposing vertical outer areas of an internal section of the motor support receiving the elastomeric body. The elastomeric rib extends to the internal surface of the flange in longitudinal direction. In this way, a movement amplitude abutment in longitudinal direction is formed for the motor support.

Furthermore, the invention relates to an arrangement featuring an engine transmission unit, a motor vehicle body with a longitudinal direction and a transverse direction, and a device for elastically mounting the engine transmission unit as described above.

Preferably, the engine transmission unit is built and mounted into a motor vehicle body in transverse direction.

Figure 6:
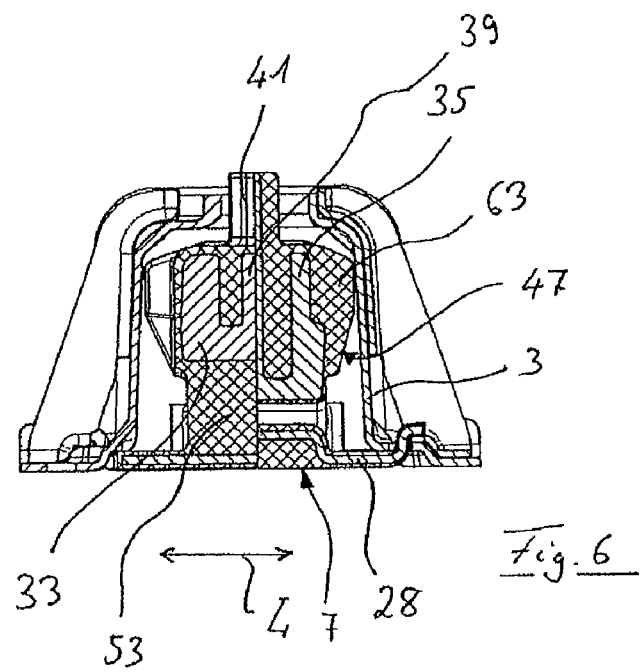

Further characteristics, advantages and features of the invention will become apparent from the following description of a preferred embodiment in conjunction with the attached drawings, in which is shown:

FIG. 1 a perspective view of an elastic mounting according to the invention for supporting a transversely mounted engine transmission unit;

FIG. 2 a top view of the mounting according to FIG. 1;

FIG. 3 a side view of the mounting according to FIG. 1 in its longitudinal direction;

FIG. 4 a side view of the mounting according to FIG. 1 in its transverse direction;

FIG. 5 a cross-sectional view of the mounting according to the invention as in FIG. 1 along the line V-V in FIG. 2; and FIG. 6 a cross-sectional view of the mounting according to the invention as in FIG. 1 along the line VI-VI in FIG. 2.

In the FIGS. 1 to 6, the elastic mounting for supporting an engine transmission unit (not shown) mounted transversely to the driving direction of a motor vehicle is generally given the reference numeral 1. The elastic mounting 1 has an arch shaped or bridge shaped flange 3 which is to be fixed at a motor vehicle body (not shown), a motor support 5 to be rigidly connected to the engine transmission unit, and an elastomeric body 7 supporting the motor support 5 on the flange and thereby on the motor vehicle body.

The flange 3 is shaped in form of a bridge which mainly extends in a longitudinal direction L. In the mounted state of the elastic mounting 1, the longitudinal direction L is aligned parallel with the longitudinal direction of the motor vehicle, i.e. the driving direction of the motor vehicle.

The bridge shape of the flange 3 is open in transverse direction Q. The motor support 5 extends outwards from an open lateral side 11 of the flange 3, wherein the outward extending section 13 of the motor support serves for mounting the engine transmission unit.

The flange 3 has two mounting shoes 15, 17, each of which is formed with two mounting bores being positioned in pairs aligned in longitudinal and transverse direction.

From each of the mounting shoes 15, 17 extends one vertical leg 19, 21, wherein the legs 19, 21 are connected with each other via a horizontal bridge portion 23.

At the outer surface of the mounting shoes 15, 17 and the legs 19, 21 outwardly extending ribs are provided for giving rigidity to the flange structure.

In the bridge portion 23, an oval opining 25 is formed essentially in its middle. The oval opening 25 defines a centre point M located on the transverse axis A and the longitudinal axis B of the flange 3.

Resulting from its bridge shape, the flange 3 is open at the bottom in vertical direction V wherein this open side is closed by a closure plate 28, which is border crimped to the flange.

The flange 3 is formed from a piece of sheet metal of about 1 mm thickness. The mounting shoe 15, 17, the legs 19, 21 as well as the bridge portion 23 are bent from one piece, whereas the rib portions are partially mounted separately.

The motor support 5 is formed by a transverse arm 29 and a longitudinal arm 31, which essentially extend vertical to each other. The transverse arm 29 is to its largest part surrounded by the flange 3. The transverse arm 29 forms an attachment section 33, comprising a comb shape with at least three teeth 35 at least partially embedded by the elastomeric body. The teeth 35 extend mainly in vertical direction V as well as in transverse direction Q. The attachment section 33 defines a middle tooth 39, which merges as one piece into an abutment peg 41 at its vertical upper end, centred in transverse direction Q, the abutment peg 41 extending through the oval opening in the bridge portion of flange 3. In the load free operating state, peg 41 is positioned in the middle of oval opening 25. The peg 41 has a larger transverse dimension than its longitudinal dimension, so that a larger amplitude of movement of the motor support 5 is provided in longitudinal direction L than in transverse direction Q.

The longitudinal arm 31 extends essentially in longitudinal direction L past flange 3 and provides free mounting surfaces for mounting the engine transmission unit. For mounting the engine transmission unit two fixing holes are provided aligned in longitudinal direction.

The elastomeric body 7 connecting the motor support 5 with the flange 3 is supported in vertical direction V by the closing plate 28, which is partially embedded in the elastomeric body. The elastomeric body 7 has three spring components independent from each other, namely a vertical support spring 45, a longitudinal direction abutment 47 and a transverse direction abutment 49 in form of the peg 41 padded with elastomeric material.

The vertical support spring 45 is formed by two spring arms 51, 53 inclined towards each other. The spring arms 51, 53 spread away from each other in transverse direction. The spring arms 51, 53 define spring directions in an acute angle with respect to transverse direction Q and vertical direction V. The spring arms 51, 53 contact support surfaces 55 of the attachment section 33 as well as support surfaces 57 of the closure plate 28. Both support surfaces 55, 57 are parallel and diametrically facing each other and are inclined with respect to vertical direction V and transverse direction Q at an angle of about 45°. The support surfaces 55, 57 extend parallel to the longitudinal direction L.

Between the spring arms 51, 53, there is a deformation cavity 61, which is limited by the attachment section 33, the spring arms 51, 53 and the closure plate 28.

Owing to the essentially V-shaped arrangement of the spring arms 51, 53, a stable elastic guidance of the motor support 5 is provided in transverse direction Q, wherein resilience is provided in longitudinal direction L owing to an orientation of the spread out legs 51, 53 in transverse direction Q.

The abutment 47 in longitudinal direction is formed by several elastomer ribs 63 extending away from the attachment section 33 in longitudinal direction L, wherein also in the unloaded state the elastomer ribs nearly abut the internal surface of the flange 3.

It appeared surprisingly that through the structural features described above, an elastic mounting for built-in engine transmission units can be realised which has excellent supporting characteristics as well as good acoustic decoupling wherein the dimensions of the mounting can be reduced by more than 20% compared to usual mountings of the same field of application. In this way, a motor vehicle with transversely mounted engine transmission unit can be optimised with respect to its crash behaviour because a larger crumple zone is provided in the engine compartment especially in longitudinal direction L, owing to the small dimensions of the engine transmission mounting. The dimension reduction with sustained supporting characteristics can be explained by the independent structuring of the individual spring elements in vertical direction V, in longitudinal direction L and in transverse direction Q. It became apparent that spring abutments in transverse direction and in longitudinal direction are sufficient. A vertical supporting spring which has a preferred stiff spring direction in transverse direction Q but remains relatively soft in longitudinal direction L still provides good supporting characteristics when in operation with transversely mounted engine transmission units.

The features presented in the above description and the figures and the claims can be relevant for the invention individually as well as in any combination with each other.

The invention claimed is:

1. A device for elastically mounting an engine transmission unit on a motor vehicle body, comprising a motor support rigidly mountable onto the engine transmission unit, a flange rigidly mountable to the motor vehicle body, defining a longitudinal direction to be aligned with the driving direction, and partially surrounding the motor support in the longitudinal direction, wherein the motor support essentially extends out of the flange in a transverse direction, perpendicular to the longitudinal direction, and is facing the engine transmission unit for forming a mounting area for the engine transmission unit, and an elastomeric body via which the motor support is elastically supported by the flange and which has a vertical support spring to absorb an essentially static load from the weight of the engine transmission unit, the load acting vertically to the longitudinal direction and the transverse direction wherein the vertical support spring comprises two spring arms inclined towards each other and spreading away from each other in the transverse direction.

2. Device as in claim 1 wherein the elastomeric body forms a transverse spring abutment for limiting an amplitude of movement of the motor support in the transverse direction and a longitudinal spring abutment for limiting an amplitude of movement of the motor support in the longitudinal direction.

3. Device as in claim 2 wherein the spring directions of the spring arms form an acute angle towards the vertical direction and the transverse direction.

4. Device as in claim 3 wherein the spring direction are essentially longitudinal with respect to the longitudinal direction.

5. Device as in claim 4 wherein the angle of each spring direction towards the vertical direction and/or the transverse direction are essentially equal.

6. Device as in claim 5 wherein the spring direction of a spring arm is essentially defined by a direction vertical to contact surfaces for the spring arms on the motor support and on the flange, the contact surfaces being parallel and facing each other diametrically, the contact surfaces for the spring arms being inclined with respect to the vertical and the transverse direction and lying in a plane in the longitudinal direction.

7. Device as in claim 6 wherein an in particular imaginary intersection of the spring direction is located inside the motor support.

8. Device as in claim 7 wherein an in particular imaginary intersection of the spring directions is located on a longitudinal axis of symmetry of the flange.

9. Device as in claim 1 wherein the flange has an arch shape extending in the longitudinal direction with at least one open passage in the transverse direction, wherein the flange is closed at its bottom side by a plate.

10. Device as in claim 9 wherein the motor support has an attachment section surrounded by the flange where the elastomeric body is mounted, the attachment section can have a comb shape with at least two, preferably three teeth extending in a vertical direction.

11. Device as in claim 10 wherein the teeth extend essentially straight in the vertical direction and in the transverse direction.

12. Device as in claim 11 wherein the teeth are arranged in a longitudinal direction at a distance to each other.

13. Device as in claim 11 wherein the flange is formed out of one piece of sheet metal the wall thickness of which is less than 5 mm, preferably about 3 mm.

14. Device as in claim 13 wherein the motor support has an abutment peg protruding in the vertical direction and extending through an encirculating hole formed in the flange, so that the amplitude of movement of the motor support relative to the flange is limited at least in the transverse direction.

15. Arrangement comprising an engine transmission unit, a motor vehicle body with a longitudinal direction and a transverse direction, and a device for elastically mounting the engine transmission unit formed according to claim 1.

16. A method for elastically mounting an engine transmission unit on a motor vehicle body, the method comprising forming a motor support rigidly mountable onto the engine transmission unit having a flange rigidly mountable to the motor vehicle body, and partially surrounding the motor support in a longitudinal direction, wherein the motor support essentially extends out of the flange in a transverse direction, perpendicular to the longitudinal direction, and is facing the engine transmission unit for forming a mounting area, and further having an elastomeric body via which the motor support is elastically supported by the flange and which has a vertical support spring to absorb an essentially static load from the weight of the engine transmission unit wherein the vertical support spring comprises two spring arms inclined towards each other and spreading away from each other in the transverse direction; and installing the motor support with the engine transmission unit in a motor vehicle body wherein the longitudinal direction is aligned with a driving direction of the motor vehicle body and so that the load acts vertically to the longitudinal direction and the transverse direction.

17. The method of claim 16 further comprising forming the flange out of one piece of sheet metal the wall thickness of which is less than 5 mm, preferably about 3 mm.

18. The method of claim 17 further comprising forming an encirculating hole in the flange to receive an abutment peg protruding in a vertical direction so that a movement amplitude of the motor support relative to the flange is limited at least in the transverse direction.

19. The method of claim 18 wherein the elastomeric body forms a transverse spring abutment for limiting the movement amplitude of the motor support in the transverse direction and a longitudinal spring abutment for limiting an amplitude of movement of the motor support in the longitudinal direction.

20. The method of claim 19 wherein the spring directions of the spring arms form an acute angle towards the vertical direction and the transverse direction.

* * * * *